United States Patent
Adkins et al.

(10) Patent No.: US 9,535,852 B2
(45) Date of Patent: *Jan. 3, 2017

(54) SYSTEM AND METHOD FOR SECURED HOST-SLAVE COMMUNICATION

(71) Applicant: Lexmark International, Inc., Lexington, KY (US)

(72) Inventors: Christopher Alan Adkins, Lexington, KY (US); Timothy John Rademacher, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/964,110

(22) Filed: Dec. 9, 2015

(65) Prior Publication Data

US 2016/0098359 A1    Apr. 7, 2016

Related U.S. Application Data

(63) Continuation of application No. 13/308,363, filed on Nov. 30, 2011, now Pat. No. 9,231,926.

(60) Provisional application No. 61/532,527, filed on Sep. 8, 2011.

(51) Int. Cl.
*H04L 9/14* (2006.01)
*G06F 12/14* (2006.01)
*H04L 9/08* (2006.01)
*H04L 29/06* (2006.01)

(52) U.S. Cl.
CPC ....... *G06F 12/1408* (2013.01); *G06F 12/1466* (2013.01); *H04L 9/0866* (2013.01); *H04L 9/0869* (2013.01); *H04L 63/0435* (2013.01); *G06F 2212/1052* (2013.01); *G06F 2212/402* (2013.01)

(58) Field of Classification Search
CPC .... H04L 9/0866; H04L 9/0869; H04L 9/3236; H04L 63/068; H04L 63/08; H04L 63/0876
See application file for complete search history.

(56) References Cited

U.S. PATENT DOCUMENTS 5,386,369 A * 1/1995 Christiano ............ G06F 21/123
705/400
5,708,831 A * 1/1998 Schon .................. G06F 12/0669
340/9.16

(Continued)

*Primary Examiner* — Scott M Sciacca

(57) ABSTRACT

Slave device circuitry, including processing circuitry which is configured to determine a new session identification value; determine a seed value using a secure hash algorithm on a previously determined seed value; determine a slave number from using the secure hash algorithm on the new session identification value, the determined seed value, and a serial number of the slave device associated with the slave device circuitry; receive a host number from the host imaging apparatus and calculate a session key using a hash-based algorithm computation on the host number, the slave number, the new session identification value, and a stored encryption key. The session key has a first portion for performing encryption and decryption operations on data to be transmitted and data received by the slave device, respectively, and a second portion for generating a new address value of the slave device for communicating with the host.

21 Claims, 2 Drawing Sheets

(56) References Cited

U.S. PATENT DOCUMENTS

| | | | | |
|---|---|---|---|---|
| 7,453,492 | B2* | 11/2008 | Silverbrook | B41J 2/14314 348/207.2 |
| 9,231,926 | B2* | 1/2016 | Adkins | H04L 9/0866 |
| 2002/0006197 | A1* | 1/2002 | Carroll | H04L 9/0662 380/44 |
| 2002/0110242 | A1* | 8/2002 | Bruwer | G07C 9/00023 380/255 |
| 2002/0152380 | A1* | 10/2002 | O'Shea | H04L 9/3247 713/170 |
| 2002/0172359 | A1* | 11/2002 | Saarinen | G06F 7/588 380/46 |
| 2004/0205177 | A1* | 10/2004 | Levy | H04L 41/0654 709/223 |
| 2005/0071627 | A1* | 3/2005 | Montenegro | H04L 9/3236 713/151 |
| 2005/0096124 | A1* | 5/2005 | Stronach | G06Q 30/06 463/25 |
| 2006/0020796 | A1* | 1/2006 | Aura | H04L 9/3236 713/168 |
| 2006/0195639 | A1* | 8/2006 | Yang | G06F 13/4291 710/110 |
| 2006/0236109 | A1* | 10/2006 | Krischer | H04L 67/14 713/171 |
| 2006/0239690 | A1* | 10/2006 | Dybsetter | G06F 13/4291 398/135 |
| 2007/0016778 | A1* | 1/2007 | Lyle | H04L 9/12 713/169 |
| 2007/0083491 | A1* | 4/2007 | Walmsley | G06F 21/608 |
| 2007/0109598 | A1* | 5/2007 | Clark | G06F 17/30274 358/1.16 |
| 2007/0162591 | A1* | 7/2007 | Mo | H04L 43/16 709/224 |
| 2007/0167943 | A1* | 7/2007 | Janssen | A61B 18/1477 606/41 |
| 2008/0162938 | A1* | 7/2008 | Struik | H04L 9/0838 713/171 |
| 2008/0184341 | A1* | 7/2008 | Sebesta | H04L 63/0807 726/4 |
| 2008/0186367 | A1* | 8/2008 | Adkins | B41J 2/17546 347/86 |
| 2008/0256276 | A1* | 10/2008 | Ellison | G06F 13/4295 710/106 |
| 2008/0301344 | A1* | 12/2008 | Hsieh | G06F 13/4282 710/110 |
| 2009/0070506 | A1* | 3/2009 | Furtner | H04L 25/4906 710/110 |
| 2009/0092060 | A1* | 4/2009 | Goto | H04L 63/0428 370/254 |
| 2010/0005319 | A1* | 1/2010 | Pohm | G06F 21/78 713/193 |
| 2010/0287382 | A1* | 11/2010 | Gyorffy | G06F 21/36 713/185 |
| 2010/0306431 | A1* | 12/2010 | Adkins | G06F 13/4291 710/110 |
| 2011/0029705 | A1* | 2/2011 | Evans | G06F 13/4291 710/110 |
| 2011/0078443 | A1* | 3/2011 | Greenstein | H04L 63/061 713/169 |
| 2011/0119419 | A1* | 5/2011 | Chapelle | G06F 13/4068 710/110 |
| 2011/0131415 | A1* | 6/2011 | Schneider | H04L 9/3226 713/171 |
| 2011/0162082 | A1* | 6/2011 | Paksoy | G06F 21/78 726/26 |
| 2012/0182832 | A1* | 7/2012 | Eperjesi | G01V 1/223 367/77 |
| 2012/0272064 | A1* | 10/2012 | Sundaram | H04L 9/0894 713/171 |

* cited by examiner

SYSTEM AND METHOD FOR SECURED HOST-SLAVE COMMUNICATION

CROSS REFERENCES TO RELATED APPLICATIONS

The present application is a continuation application and claims priority from U.S. patent application Ser. No. 13/308,363, filed Nov. 30, 2011, entitled "System and Method for Secured Host-Slave Communication," which itself is related to and claims priority from U.S. provisional patent application 61/532,527, filed Sep. 8, 2011, entitled, "System and Method for Secured Host-Slave Communication." The content of both applications are hereby incorporated by reference herein their entirety.

BACKGROUND

1. Field of Disclosure

Example embodiments of the present disclosure relate generally to secure master-slave communication, and more particularly to a communication system and method in which a session key is generated by both the master and slave devices for use in both encryption/decryption and slave address generation.

2. Description of the Related Art

Printing devices are known to use electronic authentication schemes associated with their consumable supply items. Typically, the replaceable supply item contains an integrated circuit chip that communicates with the controller located in the printer. In such an arrangement, the printer is configured as the host device and each supply item as a slave device. The controller in the host checks the authenticity of each slave device by sending a challenge thereto. The authenticity is verified by the host receiving from the slave device the correct response to the challenge.

In some existing consumable authentication schemes, the host and slave devices communicate over the I$^2$C bus. The host sends commands to the slave using the slave address assigned thereto, the slave executes the commands and sends responses, as appropriate, back to the host. The commands and data are sent with no data checking.

While the communications between hosts and slaves are not encrypted, such a system utilizes a unique slave address change feature in order to make duplicating the function of the slave device more difficult. The slave address is changed on a regular basis to slave address values determined by an algorithm that is known to both the host and slave. After receiving an address change command from the host, the slave will not respond to address polls from the host until after a certain command is received on the new address. The current address is stored in nonvolatile memory of both the host and slave so the current address, along with the position in the address sequence, is maintained over power cycles.

The address change feature makes cloning the integrated circuit chip of the slave device more difficult because the algorithm for computing the next slave address value utilizes the current value thereof. The problem with this feature is the host and slave can become unsynchronized in the address sequence. For example, this will happen when moving a slave supply item from one host printer to another because the second printer will not know where the slave device is in the address sequence. To overcome this, a means for resetting the sequence is provided, which substantially weakens the security of the system.

In particular, the existing system suffers from 1) a lack of data checking and correcting; 2) unencrypted communication; and 3) resettable slave address sequences.

Operation in noisy environments may cause data corruption on the bus, but the existing system does not have means for detecting or correcting these noise induced errors. This is of some importance because the supply items (slave devices) are often located within the host printer a relatively long distance from the host controller and the communications bus wires may be routed near aggressive noise sources, such as motors. Sending the commands in unencrypted form allows an attacker to learn the system's commands and data by capturing traffic between the printer controller and the supply item.

Based upon the foregoing, a need exists for an improved host-slave communication system.

SUMMARY

Example embodiments overcome shortcomings with existing communication schemes and thereby satisfy a significant need for a slave device for securely communicating with a host over a bus. According to an example embodiment, the slave device includes processing circuitry and memory coupled thereto having stored therein program code instructions. The stored program code instructions, when executed by the processing circuitry, cause the processing circuitry to: determine a new session identification value based upon a stored session identification value in the memory; determine a seed value using a secure hash algorithm on a previously determined seed value; determine a first number from using the secure hash algorithm on the new session identification value, the determined seed value, and a serial number of the slave device associated with the slave device circuitry; and identify a slave number from a predetermined portion of a set of bits forming the first number.

The processing circuitry is further configured to receive a host number from the host imaging apparatus and calculate a session key using a hash-based algorithm computation of the host number, the slave number, the new session identification value, and an encryption key maintained in the memory. The session key is a single session key having a first portion for performing encryption and decryption operations on data to be transmitted and data received by the slave device, respectively, and a second portion for generating a new address value of the slave device for communicating with the host. By creating a session key that is not communicated with the host and which is used in encryption/decryption as well as slave address generation, the slave device cooperates with the host for securely communicating therewith.

BRIEF DESCRIPTION OF THE DRAWINGS

The above-mentioned and other features and advantages of the various embodiments, and the manner of attaining them, will become more apparent and will be better understood by reference to the accompanying drawings.

DETAILED DESCRIPTION

Figure 1:
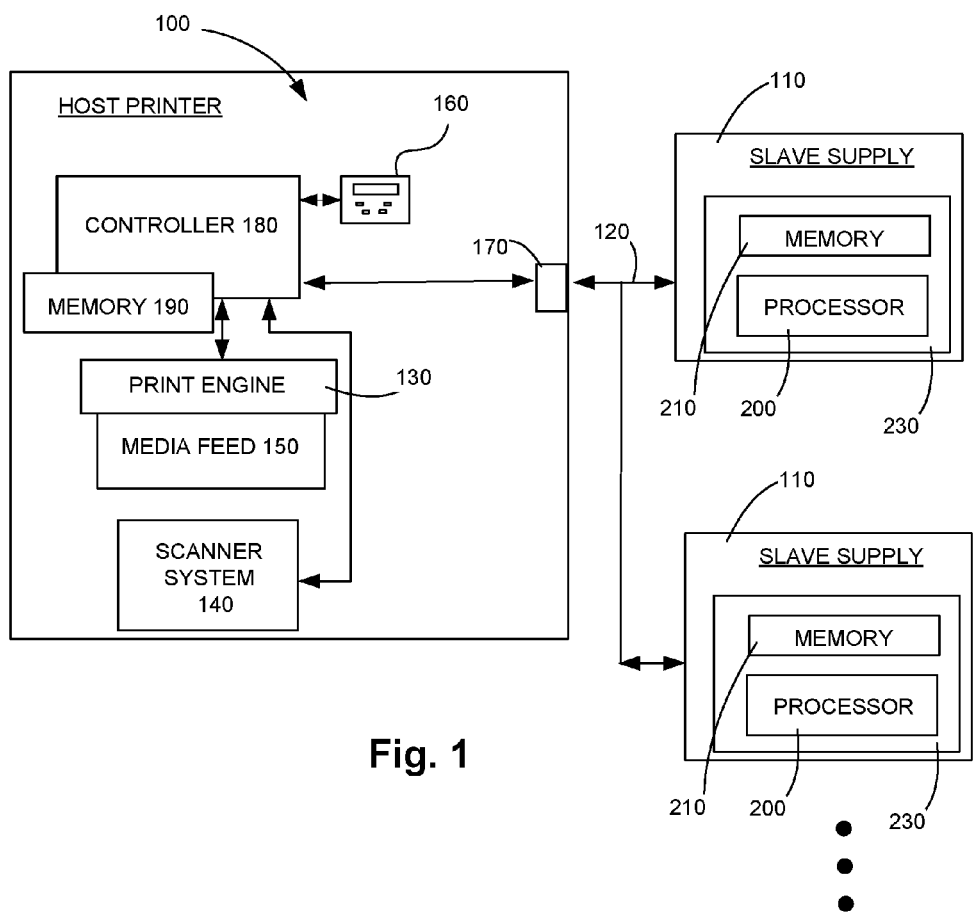
FIG. 1 is a block diagram of a communication system including a host device and at least one slave device.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof is meant herein to encompass the items listed thereafter and equivalents thereof as well as additional items. Unless otherwise limited, the terms "connected," "coupled," and variations thereof herein are used broadly and encompass direct and indirect connections and couplings. In addition, the terms "connected" and "coupled" and variations thereof are not restricted to physical or mechanical connections or couplings. Furthermore, and as described in subsequent paragraphs, the specific mechanical configurations illustrated in the drawings are intended to exemplify embodiments of the invention and that other alternative mechanical configurations are possible.

Example embodiments of the present disclosure are directed to communication between a host device 100 and one or more slave devices 110, as shown in FIG. 1. Host device 100 and slave device 110 communicate over a bus 120. In an example embodiment, host device 100 is a printing device and slave device 110 is a replaceable supply item. In particular, host device 100 may include components and modules typically utilized in printers, including a print engine 130 for imparting an image onto a sheet of media. For example, print engine 130 may be a print engine for a laser printer or for an inkjet printer. It is understood that print engine 130 may be any engine used in creating an image onto a sheet of media. Host device 100 may further include a scanner system 140 for capturing an image appearing on a media sheet for subsequent use in a printing operation, email communication or the like. A media feed system 150 may be included in host device 100 to successively move sheets of media from an input stack (not shown) to print engine 130 for performing a printing operation after which the printed sheet may be moved to an output area of host device 100 (not shown). The details of print engine 130, scanner system 140 and media feed system 150 are well known and will not be described herein for reasons of simplicity.

Host device 100 may further include a user interface 160 which allows for communication between host device 100 and a user thereof. User interface 160 may be any interface for facilitating communication between host device 100 and the user, such as, for example, a touch screen.

Host device 100 may further include an interface port 170 for communicating with one or more slave devices 110 over bus 120. Host device 100 may further include a controller 180 for controlling the different components of host device 100. In the context in which host device 100 is a printing device, controller 180 may control the operation of print engine 130, scanner system 140, media feed system 150, user interface 160 and interface 170. Controller 180 may execute instructions stored in memory 190 in order to control the various components of host device 100.

In an embodiment in which host device 100 is a printing device, slave device 110 may be an ink or toner cartridge or bottle, for example. In addition or in the alternative, slave device 110 may be another replaceable component of a host laser printer, such as a developer unit of print engine 130 or a fuser unit.

Slave device may include a processor 200 for, among other things, cooperating with host device 100 in performing slave authentication so as to only allow authorized slave devices to communicate with host device 100 and thereby prevent attacks on or damage to host device 100. Processor 200 is coupled to memory 210 having instructions stored therein for execution by processor 200. Processor 200 and memory 210 may be formed in an integrated circuit chip 230. In an alternative embodiment, processor 200 and memory 210 reside in separate integrated circuit chips. In still another alternative embodiment, slave device 110 may include circuitry, such as state machine based circuitry, for cooperating with host device 100 in performing slave authentication.

It is understood that host device 100 is not limited to a printing device and may be virtually any electronics device to which a removable and/or replaceable item may communicate over bus 120. It is similarly understood that slave device 110 may be virtually any replaceable item which communicates with host device 100, including slave devices which are communicatively coupled thereto on a temporary basis.

Bus 120 may be any bus which supports a bus protocol in which a host 100 and one or more slave devices 110 communicate with each other. According to an example embodiment, bus 120 may be an Inter-Integrated Circuit (I²C) bus. In an I²C bus, one wire of the shared bus 120 carries data in a bidirectional manner, and another wire carries clock signals from the host device 100 to the slave devices 110. Also, while the shared bus 120 is illustrated as a two-wire serial bus, shared parallel bus structures can be utilized.

According to at least some embodiments, including embodiments in which bus 120 is an I²C bus, bus 120 is a master-slave bus, with host device 100 serving as the bus master and slave devices 110 as the bus slaves. When using the I²C protocol, the host device 100 initiates all communications with the respective slave devices 110. The slave devices 110 only respond to the requests of the host device 100. In the event that an imposter is connected to the shared bus 120 and employs a valid slave address, then the imposter device can receive a communication directed to it from the host device 100. When sensitive information is passed on the bus 120 to the slave devices 110, the imposter device can receive the same in an unauthorized manner, unknown to the host device 100. This can occur if an authorized slave device 110 were to be unplugged from the shared bus 120 and the imposter device plugged therein and programmed or wired to assume the address of the slave device 110 that was unplugged. If the slave devices 110 were all equipped with fixed addresses, which has been the established practice, then it is not overly complicated to couple an imposter device to the shared bus 120 and receive sensitive communications in an unauthorized manner unknown to the host device 100. As a result, slave devices 110 occasionally change their slave addresses in response to a request by host device 100.

In an example embodiment, the host 100 and slave 110 communicate using commands and data encrypted using a stream cipher or other encryption scheme. Establishing an encryption session is done by exchanging values between the host 100 and slave 110. Then the host 100 and slave 110 each independently calculates a session key from exchanged values and a secret that is known to both. The session key is then used to initialize the cipher (or other encryption scheme) and the slave address function.

Specifically, the table below shows values used in the encryption scheme between host 100 and slave 110, including example sizes for each value.

TABLE

Encryption Values

| Data | Description | Size |
|---|---|---|
| SN | Slave serial number | 4 bytes |
| EK | Secret encryption key | 16 bytes |
| SEED | Slave random number seed | 20 bytes |
| SID | Session identification | 2 bytes |
| HRN | Host random number | 8 bytes |
| SRN | Slave random number | 8 bytes |
| SK | Session key | 20 bytes |

Each slave 110 stores in its memory 210 a unique slave serial number SN, a unique secret encryption key EK, a slave random number seed SEED and a session identifier SID in nonvolatile memory, such as memory 210. These values may be initially written to memory 210 as part of the manufacturing process for slave 110. Slave serial number SN is the unique serial number of slave 100. Secret encryption key EK is the secret key maintained in both slave 110 and host 100 that is used to derive the session key SK. Slave random number seed SEED is initialized with a true random number during the manufacturing process and updated by the slave 110 after each power cycle with a value derived from itself. The session identification SID is initialized to zero or some other value and is incremented or decremented by the slave 110 with each power cycle.

Figure 2:
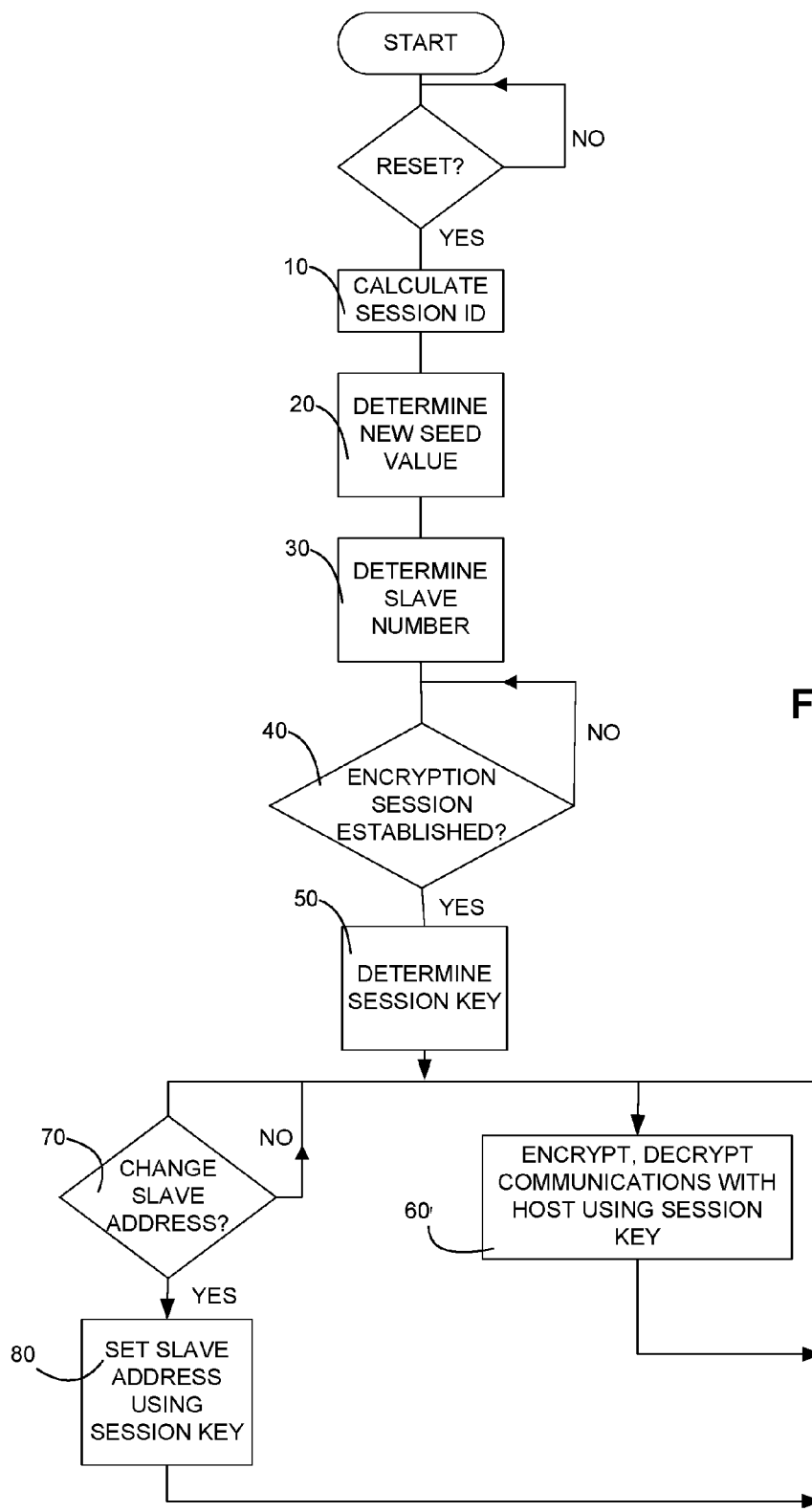
FIG. 2 is a flowchart illustrating an operation of the slave device of FIG. 1 according to an example embodiment.

The operation of slave 110 will be described below with respect to FIG. 2.

Following slave 110 being reset, which may occur, for example, by slave 110 being initially connected to and powered by host 100, slave 110 calculates at 10 a new session identification SID based upon the then current session identification SID which is maintained in nonvolatile memory 210 within slave 110. The value of new session identification SID may be calculated, for example, by incrementing or decrementing the value of the current session identification SID.

In addition, following reset, slave 110 determines a new slave random number seed SEED at 20. According to the example embodiment, $SEED_0$ represents the true random number written to memory 210 for the slave random number seed SEED during the manufacturing process of the slave device 110. Slave random number seed $SEED_i$ is the value of slave random number seed SEED after the i-th subsequent power cycle. The i-th value of slave random number seed $SEED_i$ may be updated with the $SEED_{i-1}$ value of slave random number seed SEED following power up of slave device 110. In particular, $SEED_i$ may be computed using a secure algorithm, such as a secure hash algorithm (SHA). In this way, $SEED_i$ may be represented as:

$$SEED_i = SHA\text{-}1(SEED_{i-1})$$

Where "SHA-1" is the 160-bit secure hash function published by the National Institute of Standards and Technology. It is understood that $SEED_i$ may be calculated using a different algorithm, including a different secure algorithm, such as a different SHA.

Slave random number seed $SEED_i$ is then used to compute at 30 a multi-byte random (or pseudorandom) number R, such as a 20 byte number, according to the equation:

$$R = SHA\text{-}1(SN\&SEED_i\&SID)$$

where "&" represents concatenation. The slave random number SRN for the session may be calculated to be a predetermined number of the most significant bytes of number R, such as the most significant eight bytes of R:

$$SRN = R[159:96]$$

It is understood that functions and algorithms other than SHA-1 may be utilized to generate SRN, such as another hash based algorithm.

The host 100 computes host random number HRN using a similar computation as described above for generating slave random number SRN, or any other random or pseudorandom number generator algorithm.

Host 100 and slave 110 communicate using commands and data that are encrypted. In an example embodiment, host 100 and slave 110 encrypt commands and data to be communicated with each other using a stream cipher. For example, host 100 and slave 110 may utilize the RC4 stream cipher due to its lower computational cost. It is understood, however, that any encryption scheme and/or stream cipher may be utilized by host 100 and slave 110 for communicating information therebetween. In general terms, an encryption session is established by exchanging values between host 100 and slave 110, from which host 100 and slave 110 independently calculate a session key SK based upon the exchanged values and a secret value known to each. The session key SK is then used to initialize the cipher, which as discussed in the example embodiment is a stream cipher.

To establish an encryption session at 40 for communicating encrypted information between host 100 and slave 110, host 100 sends the slave 110 host random value HRN. In response, the slave 110 sends host 100 the slave random number SRN and the session identification SID in response. Thereafter, both host 100 and slave 110 calculate at 50 the session key SK as follows:

$$SK = HMAC(EK, HRN\&SRN\&SID)$$

where HMAC is the hash-based message authentication code. As mentioned above, secret encryption key EK is known to both host 100 and slave 110, but is not transmitted on the bus 120. Session key SK may be, for example, 20 bytes in length and is not communicated over bus 120.

It is understood that other cryptographic functions, such as another hash-based function, may be utilized to generate session key SK. It is further understood that any encryption scheme could be used, and an example embodiment uses the RC4 stream cipher for its low computational cost.

According to an example embodiment, the most significant bytes of session key SK, such as SK[159:32] (16 bytes), may be used to initialize the stream cipher at 60 at the beginning of the encryption session. After initialization, the cipher produces a sequence of bytes $K_0 \ K_1 \ K_2 \ K_3 \ldots$. Both host 100 and slave 110 compute the same K byte sequence because each initialized the cipher stream with the same session key SK. Host 100 then is able to encrypt at 60 a command packet for transmission to slave 110 by performing an exclusive OR operation ("XOR-ing") the command and data bytes with $K_i$, where the value i is incremented for each byte encrypted. Upon reception of the encrypted command packet, slave 110 then decrypts at 60 the packet received by XOR-ing the bytes with the same K bytes from the cipher. Similarly, the slave 110 encrypts at 60 the response packet and transmits the encrypted response packet which the host 100 is able to decrypt using the same K bytes used by slave 110 in encrypting the response packet.

As mentioned above, the most significant bytes of session key SK may be used for an encryption session. The least significant bytes of session key SK, in this case SK[31:0] (4 bytes), may be used to initialize at 70 the slave address generator by slave 110 and host 100.

Slave 110 may use a 10-bit address on bus 120. According to an example embodiment in which host 100 is a printing device and each slave device 110 is a different toner/ink cartridge, the most significant four bits of the slave address may be fixed and assigned a value corresponding to one type of ink or toner—cyan, magenta, yellow or black, for example. The least significant six bits of the 10-bit slave address may then be set by a pseudorandom number generator (PRNG) within slave 110 and host 100. After slave 110 is reset, the least significant six bits of its slave address, i.e., the slave's I²C address, on bus 120 are 0. When host 100 instructs slave 110 to change its slave address at 70, the least significant six bits of the slave address are set from predetermined bits in the next value of the PRNG.

In accordance with an example embodiment, the PRNG may be a linear congruency generator (LCG) and may generate pseudorandom number $X_n$ as follows:

$$X_n = 2891336453 X_{n-1} + 1523469037 \bmod 2^{32}$$

where $X_{n-1}$ represents the current value of pseudorandom number $X_n$. It is understood that other LCGs and/or PRNGs may be utilized for generating pseudorandom number $X_n$.

According to an example embodiment, the LCG is initialized with a predetermined number of bytes of session key SK, such as the least significant four bytes, SK[31:0], such that:

$$X_0 = SK[31:0]$$

After host 100 reads the response to the set address command, the next value of the LCG ($X_n$) is calculated and the slave (I²C) address is set at 80 to be a predetermined a subset of bits of $X_n$. In an example embodiment, $$\text{Slave Address}[5:0] = X_n[29:24]$$

Host 100 sends commands to change addresses to the slave 110 on a periodic basis, after which host 100 and slave 110 each compute the new address $X_n$ for slave 110. Thereafter, slave 110 will not respond to address poll requests until after it has received a status request from host 100 using the new address $X_n$.

Host 100 and slave 110 communicate using command and response packets over bus 120. The packets contain a cyclic redundancy check (CRC) value to check for data errors in a packet. Data correction is accomplished by packet retransmission. If the CRC check fails in slave 110, then slave 110 returns a CRC response to the host 100. If the CRC check fails in host 100, then host 100 retransmits the previous command packet without advancing the stream cipher. In either case, host 100 retransmits the command packet again without changing its contents. This approach keeps host 100 and slave 110 synchronized in the cipher stream and also prevents the same cipher bytes from being used to encrypt different data.

The host-slave communication system described above uses an encrypted, packet-based communications scheme. A means for error detection and correction is provided utilizing CRC checks and packet retransmission. Host 100 and slave 110 exchange values so that each computes a session key SK from a secret key known to both host 100 and slave 110 but not exchanged over bus 120. The session key SK is then used to initialize both the stream cipher and bus address function. With respect to the former, host 100 and slave 110 each encrypt and decrypt their communications by XOR-ing the transmitted/received data with bytes from the stream cipher. Host 100 periodically and/or occasionally changes slave addresses on the bus 120.

Advantages over existing systems include error detection and correction, encrypted communications, and a secure address change method that will always be synchronized between host 100 and slave 110. The error detection and correction increases reliability in noisy environments. The data encryption prevents an attacker from analyzing the bus traffic to learn the meaning of the commands and data shared between host 100 and slave 110. When implemented in a system in which host 100 is a printer and slave 110 is associated with a consumable toner or ink cartridge, the above-described address change method allows a slave 110 to be moved from printer to printer without issue while maintaining secure communication with the connected printer.

While the above describes example embodiments, many variations are possible within the scope of the present disclosure. For example, as discussed above a stream cipher is used to encrypt data because of its simplicity. Alternatively, a block cipher, such as the Advanced Encryption Standard (AES), would offer relatively greater security but at a higher computational cost. In such an alternative embodiment, some or all of the determined session key SK would be used in performing encryption and decryption on information to be transmitted and information received, respectively, in accordance with the particular block cipher utilized. The protocol corrects for errors by packet retransmission. Further, a forward error correction scheme could be used where error correction bits are included in the transmitted packet. Still further, a different addressed bus, such as the Universal Serial Bus (USB), could be used for bus 120 instead of a bus utilizing the I²C protocol.

The foregoing description of one or more example embodiments has been presented for purposes of illustration. It is not intended to be exhaustive or to limit the application to the precise forms disclosed, and obviously many modifications and variations are possible in light of the above teaching. It is understood that the invention may be practiced in ways other than as specifically set forth herein without departing from the scope of the invention. It is intended that the scope of the application be defined by the claims appended hereto.

What is claimed is:

1. A supply item for an imaging apparatus, comprising:
   a processor and memory coupled thereto having stored therein program code instructions which, when executed by the processor, cause the processor to:
   following a predetermined event, determine a session identifier value;
   determine a new seed value based on a secure hash algorithm calculation on a seed value stored in the memory;
   calculate a slave random number from a predetermined number of bits resulting from a secure hash algorithm calculation on the session identifier value, the new seed value, and a serial number of the supply item;
   receive a host number from the imaging apparatus;
   calculate a session key by generating a cryptographic value using a secret key maintained in the memory and a concatenation of the host number, the slave random number, and the session identifier value, the session key being a single session key comprising a set of bits including a first subset of the set of bits and a second subset of the set of bits, the first and second subsets of the set of bits being separate from each other; and
   use the first subset of the set of bits to perform encryption and decryption operations on data to be transmitted and data received by the supply item, respectively, and the second subset of the set of bits to generate a new address value for the supply item for communicating with the imaging apparatus.

2. The supply item of claim 1, wherein the predetermined event is an initial connection to and activation of the supply item in the imaging apparatus.

3. The supply item of claim 1, wherein the session identifier value is an increment or a decrement of a stored session identifier value in the memory.

4. The supply item of claim 1, wherein the processor includes or performs as a linear congruency generator (LCG) for generating the new address value for the supply item, the LCG being initialized with the second subset of the set of bits of the session key.

5. The supply item of claim 4, wherein a predetermined portion of an output of the LCG forms a first portion of the new address value for the supply item, and a second portion of the new address value for the supply item is a fixed value.

6. The supply item of claim 5, wherein the predetermined portion of the output of the LCG forms the first portion of every new address value generated.

7. The supply item of claim 1, wherein the supply item communicates with the imaging apparatus using a stream cipher, and the first subset of the set of bits of the session key are used to initialize the stream cipher at a beginning portion of an encryption session between the supply item and the imaging device.

8. The supply item of claim 1, wherein the secure hash algorithm calculation on the session identifier value, the new seed value, and the serial number of the supply item comprises a SHA-1 algorithm calculation thereof.

9. The supply item of claim 1, wherein the cryptographic value comprises a hash-based message authentication code value.

10. The supply item of claim 1, wherein the secret key is unique to the supply item.

11. The supply item of claim 1, further comprising instructions to, in response to receiving the host number, send the slave random number and the session identifier value to the imaging apparatus for the imaging apparatus to calculate the session key.

12. Slave device circuitry for a slave device of a host imaging apparatus, comprising:
  processing circuitry and memory coupled thereto, the processing circuitry configured to:
    determine a new session identification value based upon a stored session identification value in the memory;
    determine a seed value using a secure hash algorithm on a previously determined seed value;
    determine a first number from using the secure hash algorithm on the new session identification value, the determined seed value, and a serial number of the slave device associated with the slave device circuitry;
    identify a slave number from a predetermined portion of a set of bits forming the first number;
    receive a host number from the host imaging apparatus; and
    calculate a session key using a hash-based algorithm computation on the host number, the slave number, the new session identification value, and an encryption key maintained in the memory, the session key being a single session key having a first portion for performing encryption and decryption operations on data to be transmitted and data received by the slave device, respectively, and a second portion for generating a new address value of the slave device for communicating with the host.

13. The slave device circuitry of claim 12, wherein the session key comprises a set of bits, the first portion of the session key comprises a first subset of the set of bits of the session key and the second portion of the session key comprises a second subset of the set of bits of the session key, the first and second subsets being separate from each other.

14. Slave device circuitry of claim 12, wherein the processing circuitry includes or performs as a pseudorandom number generator (PRNG) for generating the new address value for the slave device, the PRNG being initialized with the second portion of the session key.

15. Slave device circuitry of claim 14, wherein a predetermined portion of an output of the PRNG forms a first portion of the new address value for the slave device, a second portion of the new address value for the supply item is a fixed value.

16. Slave device circuitry of claim 15, wherein the predetermined portion of the output of the PRNG forms the first portion of every new address value generated.

17. Slave device circuitry of claim 12, wherein the secure hash algorithm is a SHA-1 function.

18. Slave device circuitry of claim 12, wherein the hash-based algorithm computation comprises a hash-based message authentication code (HMAC) computation on the encryption key and a concatenation of the host number, the slave number, and the new session identification value.

19. Slave device circuitry of claim 12, wherein the slave device circuitry communicates with the host imaging apparatus using a stream cipher, and the first portion of the session key is used to initialize the stream cipher at a beginning portion of an encryption session between the slave device circuitry and the host imaging apparatus.

20. A method for securely communicating with a host imaging apparatus by a removable supply item thereof, the removable supply item including circuitry and memory, the method comprising:
  determining, by the circuitry, a new session identification value based upon a session identification value stored in the memory;
  updating, by the circuitry, a seed value stored in the memory to obtain an updated seed value;
  determining, by the circuitry, a first number from a result of calculating the new session identification value, the updated seed value, and a serial number of the removable supply item using a secure hash algorithm, the first number comprising a set of bits;
  identifying a slave number from a predetermined number of bits from the set of bits of the first number;
  receiving a host number from the host imaging apparatus; and
  calculating a session key using a hash-based algorithm on the host number, the slave number, the new session identification value, and a unique secret encryption key maintained in the memory, the session key being a single session key comprising a first predetermined set of bits and a second predetermined set of bits separate from the first predetermined set of bits, the first predetermined set of bits for performing encryption and decryption operations on data to be transmitted and data received by the removable supply item and the second predetermined set of bits for generating a new address value for the removable supply item to communicate with the host imaging apparatus, wherein the circuitry includes or performs as a pseudo-random number generator (PRNG) having an output, the second predetermined set of bits of the session key used for initializing the PRNG, predetermined bits of the output of the PRNG being used to form a portion of the new address value for the removable supply item.

21. The method of claim 20, wherein the circuitry communicates with the host imaging apparatus using a stream cipher, and the first predetermined set of bits of the session key is used to initialize the stream cipher at a beginning portion of an encryption session between the circuitry and the host imaging apparatus.

* * * * *